Figure 1:
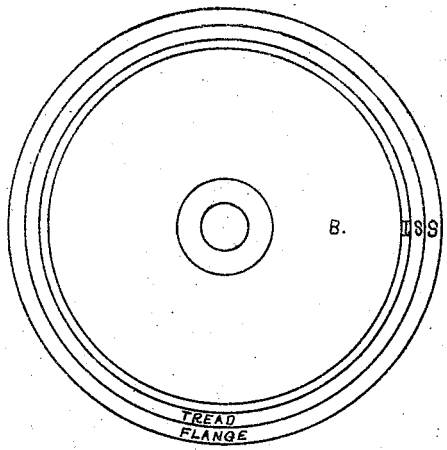

J. J. YOUNG.
Constructing Steel-Tired Cast Wheels.

No. 133,738. Patented Dec. 10, 1872.

WITNESSES:
Jos. S. Johnston
Lewis A. Young

INVENTOR:
John Jay Young ered.

UNITED STATES PATENT OFFICE.

JOHN JAY YOUNG, OF CHICAGO, ILLINOIS.

IMPROVEMENT IN CONSTRUCTING STEEL-TIRED CAST-WHEELS.

Specification forming part of Letters Patent No. 133,738, dated December 10, 1872.

*To all whom it may concern:*

Be it known that I, JOHN JAY YOUNG, of Chicago, county of Cook and State of Illinois, have invented certain Improvements in Constructing Steel-Tired Cast-Wheels, of which the following is a specification:

My invention consists in the interposition, between the steel forming the tire and the metal forming the center and body of the wheel, of a band or layer of wrought-iron of suitable diameter, width, and thickness proportionate to the size of the wheel, and either straight, angular, or curved to conform to the shape of the periphery of the wheel, if such conformation be desired.

At the time of casting the wheel and tire, this band, ring, or layer of iron, heated to a welding-heat, (or, if not so heated, then with the oxide removed by any convenient process, such as by polishing or by immersion in acid,) having been placed in the mold in which the steel-tired wheel is to be cast, the molten steel designed for the tire is cast around the outside of said band or ring, so that the wearing-surface or outside circumference of the wheel shall be composed of a cast-steel tire; and the metal which is to form the body and center of the wheel is at the same time cast around the inside of said band or ring, the molten metals forming the tire and the body of the wheel being kept apart in the mold by said band or layer. The steel tire being thus cast around, and in the process of casting welded to, the band or ring of wrought-iron, is, by means of said band or ring, welded also to the metal forming the body and central part of the wheel, and may be tempered and hardened uniformly, if desired, without risk of breaking, chipping, or splitting.

I am aware that steel-tired wheels are constructed by first hammering or rolling the tire to suitable shape and diameter, and then casting the body and center of the wheel inside the tire, and making a direct weld in process of casting. But in my invention the ring, band, or layer of wrought-iron is the initial point, and to it the tire as well as the body of the wheel is welded in the process of casting.

In making the band, layer, or ring above described, and for the purpose as stated, I do not mean to confine myself to the use of wrought-iron alone. Decarbonized or soft steel, or any other metal which will remain tough, and to which the tire and central part of the wheel are capable of being welded in the process of casting, may be used. The tire may be composed of the alloy of chromium and iron, commonly known as chrome-steel; or it may be cast-steel while the body or central part of the wheel may be cast-steel, or chrome-steel, or cast-iron.

Figure 2:
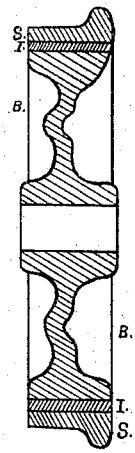
Figure 3:
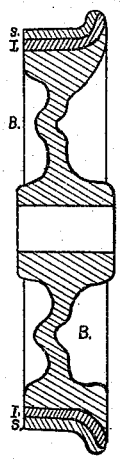
Figure 4:
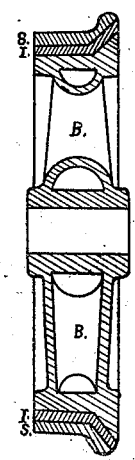

Figure 1 is a front view of a wheel, showing the layer of wrought-iron which extends through to the opposite face of the wheel. Figs. 2, 3, and 4 are sectional views, showing some of the different forms and positions in which the ring or layer of wrought-iron may be placed between the tire and body of the wheel.

In each of the aforenamed figures, I represents the wrought-iron band, ring, or layer; S represents the steel-tire; and B, the body or central part of the wheel.

Therefore, I claim as my invention—

The use, application, and interposition of a band, ring, or layer of wrought-iron, or other equivalent metal, as above stated, in the construction of steel-tired cast-wheels between the molten steel which is to form the tire and the metal which is to form the remainder of the wheel, so that the tire can be cast at the same time with the body of the wheel, and for the further purpose of making a continuous weld of the tire and body of the wheel, for materially strengthening both the tire and body of the wheel, and for preventing the breaking, chipping, or splitting of the tire, especially if it be desired to temper and give a uniform hardness to the same.

JOHN JAY YOUNG.

Witnesses:
  JOS. S. JOHNSTON,
  LEWIS A. YOUNG.